United States Patent
Narang et al.

(10) Patent No.: US 8,326,294 B2
(45) Date of Patent: Dec. 4, 2012

(54) DEVICES AND METHODS FOR WIRELESS SYSTEM ACQUISITION

(75) Inventors: Mohit Narang, Cupertino, CA (US); Jonathan R. Cook, Saratoga, CA (US)

(73) Assignee: Qualcomm Incorporated, San Diego, CA (US)

( * ) Notice: Subject to any disclaimer, the term of this patent is extended or adjusted under 35 U.S.C. 154(b) by 383 days.

(21) Appl. No.: 12/622,338

(22) Filed: Nov. 19, 2009

(65) Prior Publication Data

US 2011/0117911 A1 May 19, 2011

(51) Int. Cl.
*H04W 88/06* (2009.01)
(52) U.S. Cl. .................. 455/434; 455/552.1; 370/332
(58) Field of Classification Search .......... 455/434, 455/552.1, 432.1, 550.1, 452.1, 67.11, 525, 455/69, 517, 522; 370/342, 329, 332, 335
See application file for complete search history.

(56) References Cited

U.S. PATENT DOCUMENTS

| | | | |
|---|---|---|---|
| 6,320,896 B1 | 11/2001 | Jovanovich et al. | |
| 6,327,312 B1 | 12/2001 | Jovanovich et al. | |
| 2005/0245258 A1 | 11/2005 | Classon et al. | |
| 2007/0004445 A1 | 1/2007 | Dorsey et al. | |
| 2007/0189259 A1* | 8/2007 | Sollenberger et al. | 370/342 |
| 2007/0254612 A1 | 11/2007 | Simmons et al. | |
| 2008/0102847 A1* | 5/2008 | Kim et al. | 455/450 |
| 2008/0233955 A1 | 9/2008 | Narang et al. | |
| 2008/0287125 A1* | 11/2008 | Hind et al. | 455/432.1 |
| 2009/0042566 A1* | 2/2009 | Brandt | 455/434 |
| 2009/0296661 A1* | 12/2009 | Lee et al. | 370/335 |
| 2011/0312323 A1* | 12/2011 | Didi et al. | 455/434 |
| 2012/0087362 A1* | 4/2012 | Islam et al. | 370/338 |

FOREIGN PATENT DOCUMENTS

| | | |
|---|---|---|
| WO | WO0131870 | 5/2001 |
| WO | WO 2009039211 | * 3/2009 |

OTHER PUBLICATIONS

International Search Report and Written Opinion—PCT/US2010/056978—International Search Authority, European Patent Office,Feb. 16, 2011.

* cited by examiner

*Primary Examiner* — Kamran Afshar
*Assistant Examiner* — Khawar Iqbal
(74) *Attorney, Agent, or Firm* — Francois Pelaez; S Hossain Beladi

(57) ABSTRACT

Disclosed are devices, methods and computer program products for radio access network (RAN) signal acquisition. In one aspect, a mobile device scans a radio frequency spectrum for RAN signals and detects signals corresponding to a plurality of channels of a first network type having a first channel bandwidth. The mobile device then determines a power level of the detected signal on each of the plurality of channels and discards signals having substantially equal power within a first frequency range to define a remaining set of signals. The first frequency range corresponds to a second channel bandwidth of a second network type and the second channel bandwidth is greater than the first channel bandwidth. The mobile device then ranks the remaining signals based on the determined power level and selects one of the remaining signals for acquisition based on the ranking.

24 Claims, 7 Drawing Sheets

| Frequency Band | Frequency Band | UpLink (MHz) | DownLink (MHz) | Common Name |
|---|---|---|---|---|
| | UMTS Band I | 1920-1980 | 2110-2170 | IMT-2000 |
| GSM 1900 | UMTS Band II | 1850-1910 | 1930-1990 | PCS |
| GSM 1800 | UMTS Band III | 1710-1785 | 1805-1880 | DCS |
| | UMTS Band IV | 1710-1770 | 2110-2170 | |
| GSM 850 | UMTS Band V | 824-849 | 869-894 | Cellular |
| | UMTS Band VI | 830-840 | 875-885 | |
| GSM 900 | | 890-915 | 935-960 | |

| Frequency Band | Frequency Band | UpLink (MHz) | DownLink (MHz) | Common Name |
|---|---|---|---|---|
| | UMTS Band I | 1920-1980 | 2110-2170 | IMT-2000 |
| GSM 1900 | UMTS Band II | 1850-1910 | 1930-1990 | PCS |
| GSM 1800 | UMTS Band III | 1710-1785 | 1805-1880 | DCS |
| | UMTS Band IV | 1710-1770 | 2110-2170 | |
| GSM 850 | UMTS Band V | 824-849 | 869-894 | Cellular |
| | UMTS Band VI | 830-840 | 875-885 | |
| GSM 900 | | 890-915 | 935-960 | |

__(2)__

DEVICES AND METHODS FOR WIRELESS SYSTEM ACQUISITION

BACKGROUND

1. Field

This disclosure relates generally to the field of wireless communications and more specifically to the devices and methods for wireless system acquisition.

2. Background

Wireless communication systems, also known as radio access networks (RANs), provide mobile device users with wireless access to packet-switched networks, such as the Internet, and various communication services and content, such as voice, data, multimedia, Web browsing and other. These wireless communication systems may be multiple-access systems capable of supporting communication with multiple mobile devices by sharing the available system resources (e.g., bandwidth and transmit power). Examples of such multiple-access systems include time division multiple access (TDMA) systems, such as global system for mobile communications (GSM), code division multiple access (CDMA) systems, frequency division multiple access (FDMA) systems, orthogonal frequency division multiple access (OFDMA) systems, Universal Mobile Telecommunications Systems (UMTS) including WCDMA, HSPA, HSUPA, 3GPP Long Term Evolution (LTE) systems and others.

GSM is currently one of the most popular communication systems in the world. GSM radio access networks operate in a number of different frequency bands. For example, second-generation (2G) GSM RANs operate in the 900 MHz or 1800 MHz bands. Third-generation (3G) GSM RANs, including Enhanced Data rates for GSM Evolution (EDGE) systems, operate in 850 MHz and 1900 MHz bands. Many other wireless communication systems, such as cdma2000, WCDMA, EV-DO, and WiMAX, are deployed in the same frequency spectrum as the GSM networks and often cause interference in operation of the GSM networks. For example, if other networks are deployed in same band, it is possible that the power of these networks would be higher than the power of the GSM network. In such a case, a mobile device trying to acquire GSM service will analyze signals from other systems first before finding GSM signals, thereby increasing an amount of time used to find GSM service. Therefore, there is a need to improve GSM system acquisition procedures in presence of collocated wireless communication systems operating in the same spectrum.

SUMMARY

The following presents a simplified summary of one or more aspects of wireless system acquisition in a multi-system wireless communication environment. This summary is not an extensive overview of all contemplated aspects, and is intended to neither identify key or critical elements of the invention nor delineate the scope of any or all aspects thereof. Its sole purpose is to present some concepts of one or more aspects in a simplified form as a prelude to the more detailed description that is presented later.

Disclosed are devices, methods and computer program products for radio access network (RAN) signal acquisition. In one aspect, a mobile communication device scans a radio frequency spectrum for RAN signals and detects a plurality of signals corresponding to a plurality of channels of a first network type having a first channel bandwidth. The mobile device then determines a power level of the detected signal on each of the plurality of channels and discards ones of the plurality of signals having substantially equal power within a first frequency range to define a remaining set of the plurality of signals. The first frequency range corresponds to a second channel bandwidth of a second network type and the second channel bandwidth is greater than the first channel bandwidth. The mobile device then ranks the remaining set of the plurality of signals based on the determined power level and selects one of the remaining sets of the plurality of signals for acquisition based on the ranking.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects of the invention will hereinafter be described in conjunction with the appended drawings, provided to illustrate and not to limit the disclosed aspects, wherein like designations denote like elements, and in which.

DETAILED DESCRIPTION

Figure 1:
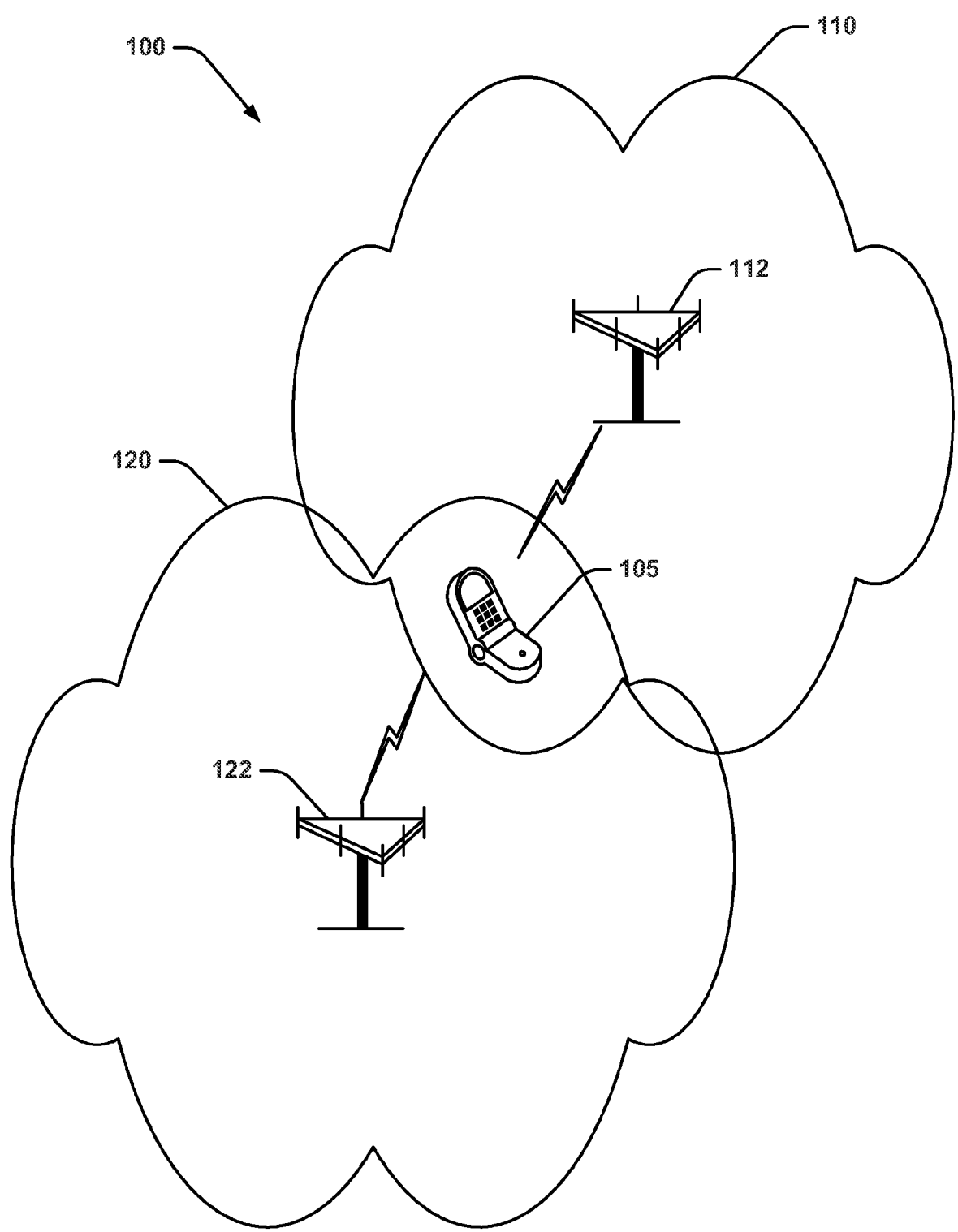
FIG. 1 is an illustration of a wireless communication system utilizing aspects of mechanisms wireless system acquisition disclosed herein.

The methodologies for wireless system acquisition in a multi-system wireless communication environment may be used in connection with various radio access technologies (RATs) such as TDMA, CDMA, FDMA, OFDMA and SC-FDMA. The terms "system" and "network" are often used interchangeably. The terms "radio access technology", "RAT", "radio technology", and "air interface" are also often used interchangeably. A TDMA system may include GSM or EDGE. A CDMA system may include Universal Terrestrial Radio Access (UTRA), cdma2000, and other radio technologies. UTRA includes WCDMA and other variants of CDMA. cdma2000 covers IS-2000, IS-95 and IS-856 standards. An OFDMA system may include Evolved UTRA (E-UTRA), Ultra Mobil Broadband (UMB), IEEE 802.16, IEEE 802.20, Flash-OFDM®, etc. UTRA and E-UTRA are part of Universal Mobile Telecommunication System (UMTS). Long Term Evolution (LTE) is an upcoming release of UMTS utilizing E-UTRA. GSM, UTRA, E-UTRA, UMTS and LTE are described in documents from an organization named "3rd Generation Partnership Project" (3GPP). cdma2000 and UMB are described in documents from an organization named "3rd Generation Partnership Project 2" (3GPP2). These various radio access technologies and communication standards are known in the art.

Various aspects or features of methodologies for wireless system acquisition in a multi-system wireless communication environment will be presented in terms of systems that may include a number of mobile devices, components, modules, and the like. It is to be understood and appreciated that the various systems may include additional devices, components, modules, etc. and/or may not include all of the devices, components, modules etc. discussed in connection with the figures. A combination of these approaches may also be used. As used in this disclosure, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet or other types of packet-switched networks with other systems by way of the signal.

Moreover, various aspects or features of methodologies for wireless system acquisition described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

FIG. 1 shows a deployment 100 of a first radio access network 110 and a second radio access network 120. In general, RANs 110 and 120 may utilize any two different radio access technologies. For clarity, much of the description below assumes that RAN 110 is a narrowband system, such as a GSM system, and RAN 120 is a wideband system, such as a cdma2000, WCDMA, EV-DO, WiMAX or other wideband wireless communication system. The terms "WCDMA" and "UMTS" are often used interchangeably. GSM system 110 may be a 2G radio access technology (RAT) that can provide voice service and low to medium rate packet data service. System 110 may also include EDGE systems, which is a 3G GSM RAN that can provide enhanced services and capabilities, e.g., higher data rates, concurrent voice and data calls, etc. In one aspect, RAN 110 and RAN 120 may be part of a public land mobile network (PLMN) and may have overlapping coverage areas.

Generally, RANs 110 and 120 provides mobile devices 105 with radio access to the wired packet-switched data network, such as the Internet, or the public switched telephone network (PSTN). To that end, GSM RAN 110 may include radio base stations 112 that communicate with mobile devices 105 within the coverage area of the GSM system. RAN 120 may include Node Bs 122 that communicate with mobile devices 105 within the coverage area network 120. Base stations 112 and Node Bs 122 facilitate establishment, maintenance and termination of radio links with the mobile devices 105, provide radio resource management and mobility management for the mobile device 105 entering and leaving these networks. Base stations 112 and Node Bs 122 are generally fixed stations that include multiple antenna groups and/or a transmitter/receiver chain that can in turn comprise a plurality of components associated with radio signal transmission and reception (e.g., processors, modulators, multiplexers, antennas, etc.) to and from mobile devices 105. Base stations 112 and Node Bs 122 may also be referred to as evolved Node Bs, access points and others. In the following description, base stations 112 may also be referred to as GSM cells.

In one aspect, mobile devices 105 may include cellular telephones, cordless telephones, Session Initiation Protocol (SIP) phones, personal digital assistants (PDAs), handheld devices having wireless connection capability, laptop computers with wireless modems, or other processing device connected to a wireless modem or a cellular network card. Mobile device 105 may be a multi-mode communication device operable to access several different radio access networks 110 and 120. In various aspects, mobile devices 105 may support data, voice and video services, including broadband Internet services, such as Web browsing, voice over IP (VoIP), IP-TV, multimedia streaming, file downloading and other types of services. Device 105 may also be called a subscriber unit, subscriber station, mobile station, mobile, remote station, remote terminal, access terminal, user terminal, terminal, wireless communication device, user agent, user device, or user equipment (UE).

Figure 2:
FIG. 2 is an illustration of a table of frequency bands for GSM and WCDMA systems.

The RAN 110 and RAN 120 may each operate on one or more frequency channels within a frequency band. The terms "frequency band" and "frequency spectrum" are often used interchangeably. FIG. 2 shows a table 200 of some frequency bands that are commonly used for GSM and WCDMA systems. Other frequency bands may also be used for GSM and WCDMA. The cellular and PCS bands are commonly used in the United States, and the IMT-2000 and GSM 1800 bands are commonly used in Europe. It should be noted that many wireless communication systems, such as cdma2000, EV-DO, WiMAX and others, may be deployed in the same frequency spectrum as the GSM and WCDMA systems.

More specifically, GSM system 110 may operate on any one of the frequency bands shown in a table 200 or other frequency bands, which may be collectively referred to as GSM bands. Each GSM band covers a number of 200 kHz radio frequency (RF) channels. Each RF channel is identified by a specific absolute radio frequency channel number (ARFCN). The RF channels may also be referred to as GSM channels and frequency channels. GSM system 110 may operate on a specific set of RF channels in a specific GSM band.

WCDMA system 120, for example, may also operate on any one of the frequency bands shown in the table 200 or some other frequency band, which may be collectively referred to as UMTS bands. Each UMTS band may cover a number of UMTS channels that may be spaced apart by approximately 5 MHz. Each UMTS channel has a bandwidth of 3.84 MHz and a center frequency that is given in 200 KHz resolution. Each UMTS channel is identified by a specific channel number, which may be a UTRAN ARFCN (UARFCN). The UMTS channels may also be referred to as WCDMA channels, UTRAN frequencies and frequency channels. The WCDMA system may operate on one or more specific UARFCNs.

As indicated above, other wireless communication technologies, such as cdma2000, EV-DO, WiMAX and others, may operate in the same frequency spectrum as the GSM systems 110. A cdma2000 1x system also operates in the 950/1800 kHz frequency bands and has channel bandwidth of about 1.25 MHz. A cdma2000 3x or EV-DO network also operates in the 1800 kHz frequency band and has channel bandwidth of about 3.75 MHz. A WiMAX network has a channel bandwidth of about between 1.25 MHz and 20 MHz.

In one aspect, the mobile device 105 is configured to operate on a GSM network 110 only. Upon power up or loss of coverage, the mobile device 105 may search for suitable cells of a GSM network 110 from which the mobile device 105 can receive communication service. The term "cell" can refer to a GSM base station 112 and/or the coverage area of the GSM base station 112, depending on the context in which the term is used. If a suitable GSM cell is found, then the mobile device 105 may perform registration with the acquired RAN 110 if necessary. The mobile device 105 may then "camp" on the cell if the mobile device 105 is in an idle mode and not actively communicating with RAN 110. The radio access network on which the mobile device 105 is camped is referred to as the serving network, and the cell on which the mobile device 105 is camped is referred to as the serving cell.

In one aspect, the mobile device 105 may perform a search for a GSM frequency band, as follows: perform a power scan and measure the received signal level of each GSM channel in the frequency band; identify strong GSM channels; attempt acquisition on each strong GSM channel, and report a list of acquired GSM channels. The mobile device 105 may obtain a received signal level for each GSM channel in the frequency band from the power scan. The terms "received signal level", "received signal strength", "received signal strength indicator", "RSSI", "received power", "receive signal code power", and "RSCP" may be used interchangeably. The mobile device 105 may rank GSM ARFCNs based on the detected power corresponding to the respective channel. The mobile device 105 may select strong GSM channels (e.g., those with received signal levels above a detection threshold) for acquisition and may discard the remaining weak GSM channels. The mobile device 105 may perform acquisition for a strong GSM channel by (i) detecting for a tone sent on a Frequency Correction Channel (FCCH), (ii) decoding a burst sent on a Synchronization Channel (SCH) to obtain a base transceiver station identity code (BSIC) for a GSM cell, and (iii) decoding a Broadcast Control Channel (BCCH) to obtain System Information Type 2quarter (SI2quarter), Type 3 (SI3), Type 4 (SI4), and/or other messages. The SI2quarter message contains information on measurement and reporting parameters and/or neighbor cells. The SI3 and SI4 messages contain information on the transmitting cell and its GSM PLMN. The GSM search may provide a list of zero, one or multiple acquired GSM channels.

However, if a collocated, non-GSM-based radio access network 120, such cdma2000, WCDMA, EV-DO or WiMAX system, is deployed in same frequency spectrum as the GSM network 110, it is possible that the power of the RAN 120 would be higher than the power of the GSM channels of RAN 110. In such a case, the mobile device 105 will power scan one or more cells of the other technology before finding GSM cells, thereby increasing an amount of time used to find GSM service and deteriorating user experience. To overcome this problem, during power up of the mobile device 105, or when the device is roaming, the mobile device 105 may be configured to identify signals corresponding to non-GSM technologies, such as WCDMA, cdma2000, EV-DO, WiMAX and others, which may be referred to as wideband signals when compared to the relatively narrowband GSM signals, and discard such wideband signals from consideration for channel acquisition. As a result, the time taken to acquire full service of the GSM network 110 may be significantly reduced.

Figure 3:
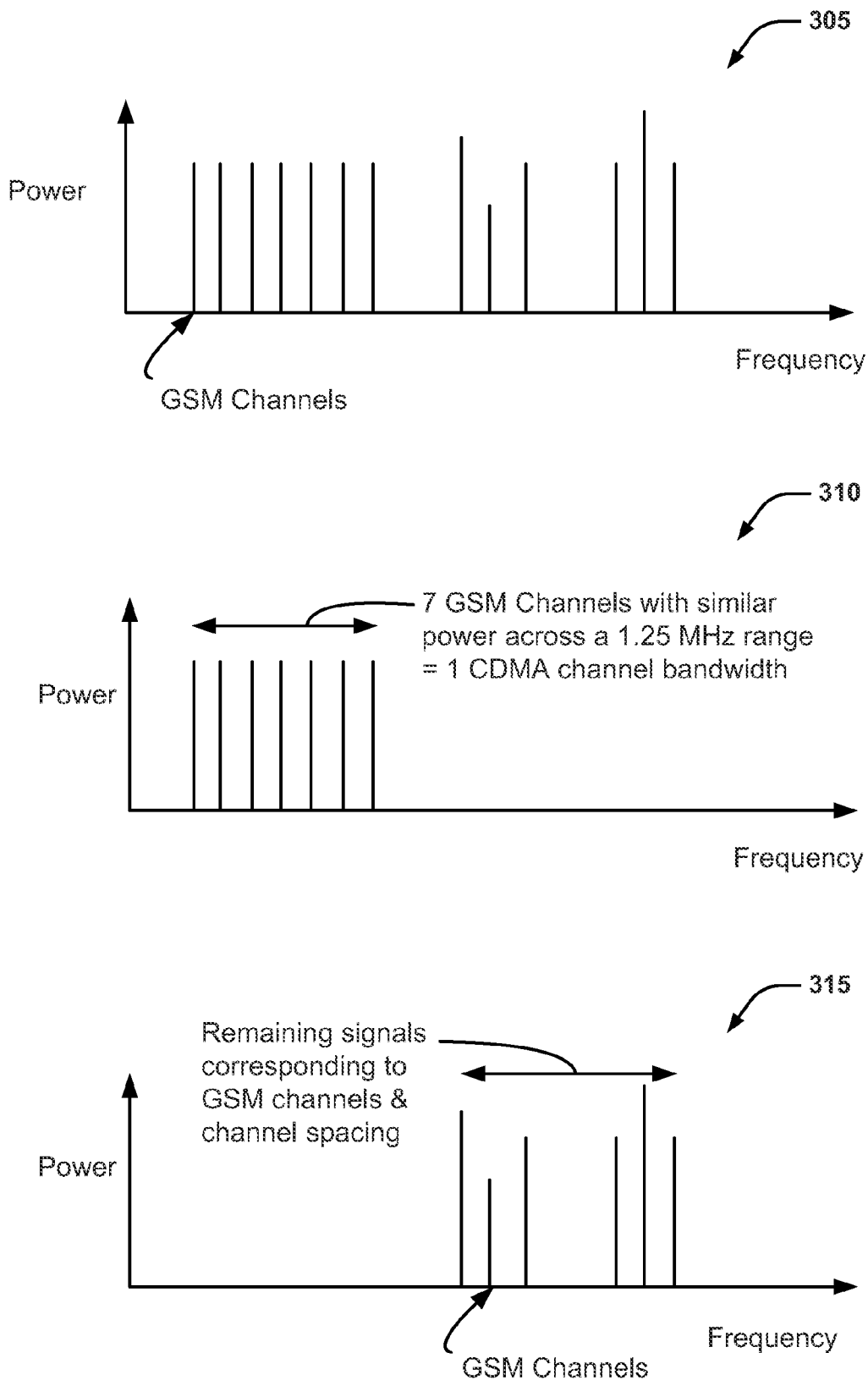
FIG. 3 is an illustration of an example methodology for wireless system acquisition.

More specifically, when a mobile device 105 scans a GSM frequency spectrum, the detected signals may include GSM signals and non-GSM signals, such as wideband signals from RAN 102, such as cdma2000, WCDMA, EV-DO, WiMAX or other wideband system. FIG. 3 shows a diagram 305 of a sample GSM frequency spectrum that includes a plurality of signals from various collocated networks operating in the same frequency band as the GSM network. The mobile device 105 may detect these signals and initially characterize them as a plurality of narrowband GSM channels. Generally, a wideband signal may have a channel bandwidth greater than a channel bandwidth of a GSM signal, e.g. a number of GSM channels may fall within a single channel of a wideband technology or non-GSM technology. Further, the non-GSM signals may be stronger than the GSM signals. As such, signals that to the mobile device 105 appear to represent a number of adjacent GSM channels would have substantially the same power level, which is the power level of the non-GSM signal having a frequency bandwidth spanning the number of adjacent GSM channels.

For example, a GSM channel has a bandwidth in the range of about 200 kHz, whereas a UMTS channel has a bandwidth in the range of about 5 MHz bandwidth, which would span about 25 GSM channels, and whereas a CDMA channel has a bandwidth in the range of about 1.25 MHz bandwidth, which would span about seven GSM channels. As such, if the mobile device 105 detects signals corresponding to a UMTS channel, then such signals may look like 25 adjacent GSM channels having substantially equal power. Similarly, for example, if the mobile device 105 detects signals corresponding to a CDMA channel, then such signals may look like 7 adjacent GSM channels having substantially equal power.

Accordingly, in one aspect, the mobile device 105 may identify a wideband signal from a non-GSM system 120 and separate the identified signals from narrowband GSM signals from GSM network 110. For example, as shown in diagram 310, the mobile device 105 may identify seven adjacent narrowband signals with similar power across a 1.25 HMz range as a single wideband CDMA channel. And, as shown in diagram 315, the mobile device 105 may identify the remaining set of detected narrowband signals having different power as GSM channels, provided they have the required channel spacing. Usually, GSM networks require a 3 channel separation between carriers in the same area. This is due to the limitations of co-channel interference (CCI) and adjacent channel interference (ACI) and the GSM channel. Thus, having identified GSM and non-GSM channels, the mobile device may discard the non-GSM channels and continue with the acquisition of the GSM channels only.

Having identified the GSM channels and non-GSM channels in this manner, the mobile device 105 does not need to schedule frequency correction channel (FCCH) and synchronization channel (SCCH) decode for non-GSM channels, thereby saving time on acquisition GSM service. For example, each FCH/SCH detection takes a finite time (~100 msec), so if the mobile device ignores, for example, two CDMA carriers (with each CDMA channel covering about 7 GSM channels) and two UMTS carriers (with each UTMS channel covering about 25 GSM channels), the time saved by the mobile device is about 6.4 seconds {(2*7)+(2*25))*100 msec} during power up, which is a substantial improvement.

In another aspect, the mobile device 105 may be configured to predict which technology wideband signal was present and take appropriate action. In other words, the mobile device 105 can determine the bandwidth of the number of adjacent GSM channels having substantially similar power, and determine if the determined bandwidth correlates to a wideband technology. For example, if there are 25 adjacent GSM channels having substantially similar power across of 5 MHz frequency range, then the mobile device 105 can determine that the bandwidth of these 25 adjacent channels corresponds to the bandwidth of a single WCDMA channel. Then, the mobile device 105 can discard these 25 signals, e.g. not consider this 5 MHz frequency range, assuming the signals correspond to a WCDMA channel instead of 25 GSM channels. Furthermore, the mobile device 105 may then take into account typical channel bandwidths and spacing, and likewise filter out additional wideband signals from the spectrum of samples. The same concept can be used for other wireless communication systems operating in the same frequency spectrum as the GSM network.

Figure 4:
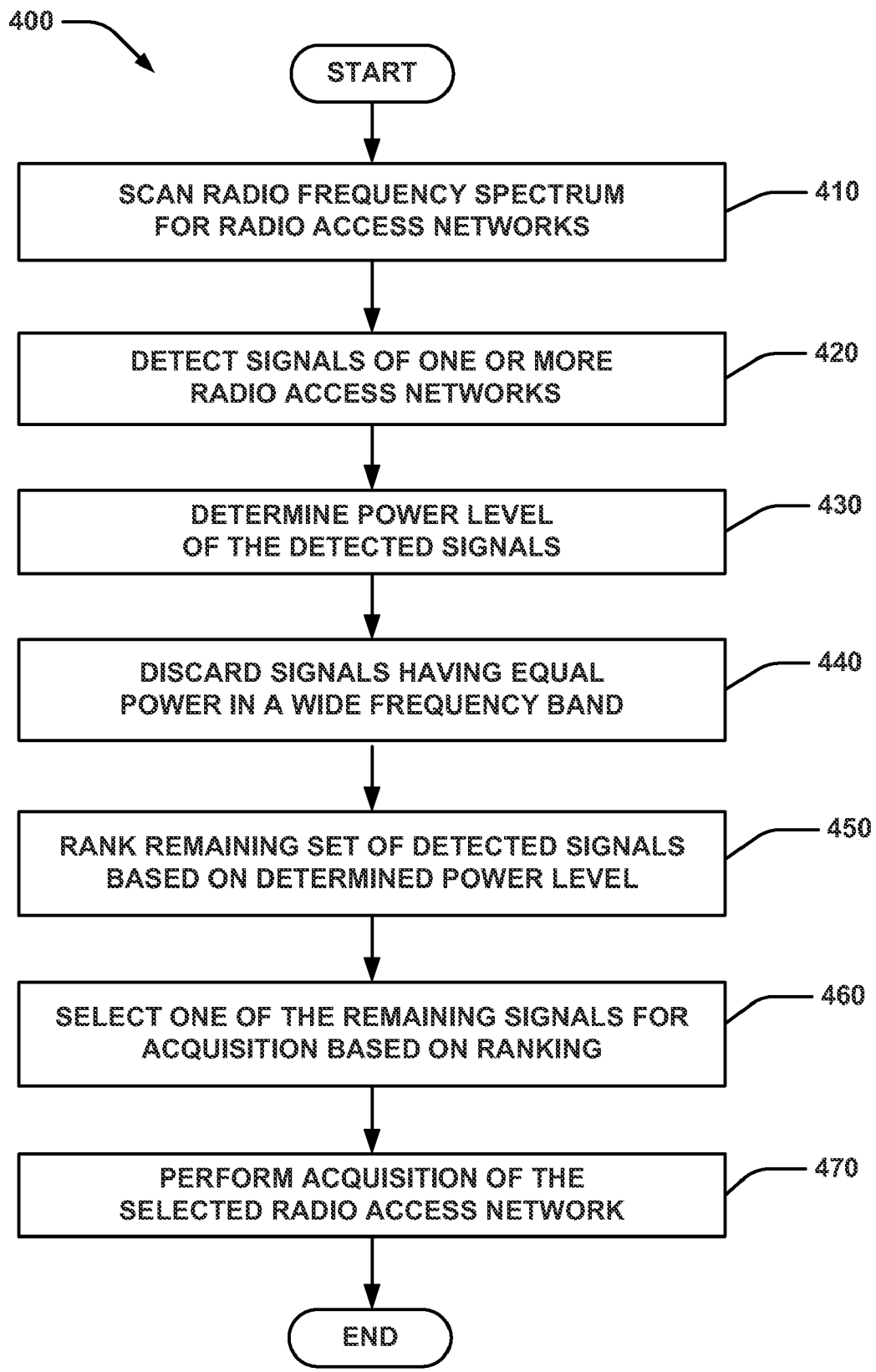
FIG. 4 is another illustration of the methodology for wireless system acquisition.

FIG. 4 illustrates one example methodology for optimizing signal acquisition from a radio access network. At step 410, a mobile device scans a radio frequency spectrum for radio access network signals. At step 420, the mobile device detects a plurality of signals corresponding to a plurality of channels of a first network type having a first channel bandwidth. At step 430, the mobile device determines a power level of the detected signal on each of the plurality of channels. At step 440, the mobile device discards ones of the plurality of signals having substantially equal power within a first frequency range to define a remaining set of the plurality of signals. In an aspect, the first frequency range corresponds to a second channel bandwidth of a second network type, such as a wideband channel bandwidth of one or more of a wideband network such as a WCDMA, cdma2000, EV-DO or WiMAX network. In this aspect, the second channel bandwidth is greater than the first channel bandwidth. The remaining set of the plurality of signals corresponds to a plurality of Absolute Radio Frequency Channel Numbers (ARFCNs) of a GSM network having channel bandwidth of about 200 kHz. At step 450, the mobile device ranks the remaining set of the plurality of signals based on the determined power level. At step 460, the mobile device selects one of the remaining sets of the plurality of signals for acquisition based on the ranking. At step 470, the mobile device performs a decoding of a frequency correction channel (FCCH) and synchronization channel (SCCH) corresponding to at least one of the remaining sets of the plurality of signals in order to acquire a new channel.

Figure 5:
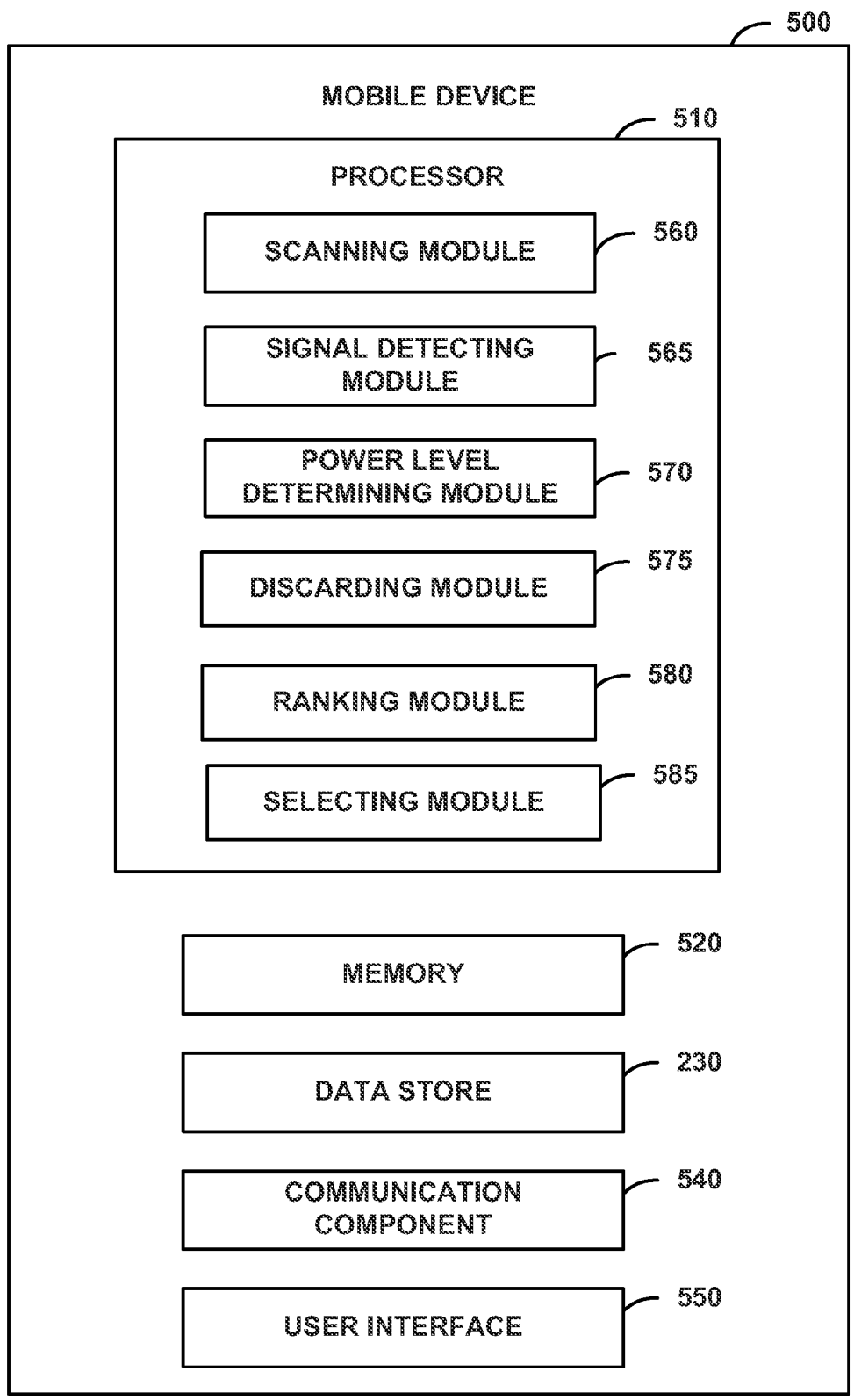
FIG. 5 is an illustration of an example mobile device implementing aspects of mechanisms for wireless system acquisition disclosed herein.

FIG. 5 illustrates an example mobile device 500 operable to perform RAN signal acquisition in accordance with methodologies disclosed herein. Mobile device 400 includes a processor 510 for carrying out processing functions associated with the signal acquisition in accordance with the methodologies disclosed herein as well as other functions. Processor 510 can include a single or multiple set of processors or multi-core processors. In one example aspect, processor 510 may include a scanning module 560 that implements procedures for scanning a radio frequency spectrum for radio access network signals. Processor 510 may also include a signal detecting module 565 for detecting a plurality of signals corresponding to a plurality of channels of a first network type, such as a GSM network, having a first channel bandwidth. Processor 510 may also include a power level determining module 570 that determines a power level of the detected signal on each of the plurality of channels. Processor 510 also includes a discarding module 575 that determines whether to discard ones of the plurality of signals having substantially equal power within a first frequency range to define a remaining set of the plurality of signals, wherein the first frequency range corresponds to a second channel bandwidth of a second network type, such as WCDM network, wherein the second channel bandwidth is greater than the first channel bandwidth. Processor 510 also includes a ranking module 580 that implements procedures for ranking the remaining set of the plurality of signals based on the determined power level. Processor 510 also includes a selecting module 585 for selecting one of the remaining set of the plurality of signals for acquisition based on the ranking.

Mobile device 500 further includes a memory 520 coupled to processor 510, such as for storing program instructions for RAN signal acquisition being executed by processor 510. Memory 520 can include any type of memory usable by a computer, such as random access memory (RAM), read only memory (ROM), magnetic discs, optical discs, volatile memory, non-volatile memory, and any combination thereof. Additionally, mobile device 500 may further include a data store 530 coupled to processor 510, which can be any suitable combination of hardware and/or software, that provides for mass storage of information, databases, and programs employed in connection with aspects described herein. For example, data store 530 may be a data repository for programs or subroutines not currently being executed by processor 510 as well as files containing algorithms for RAN signal acquisition and various data associated therewith.

Further, mobile device 500 includes a communications component 540 coupled to processor 510 for searching, establishing and maintaining communications with various radio access networks as described herein. For example, communications component 540 may include transmit chain components and receive chain components associated with a transmitter and receiver, respectively, operable for interfacing with wireless communication systems and devices of various radio access technologies and protocols. The data transmission module 590 instructs communications component 540 to transmit/receive data to/from one or more radio access networks, such as GSM, WCDMA and other networks.

Mobile device 500 may include a user interface component 550 coupled to processor 510 and being operable to receive inputs from a system administrator and further operable to generate outputs for presentation to the system administrator. Component 550 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, component 550 may include one or more output devices, including but not limited to a display, a speaker, a haptic feedback mechanism, a printer, any other mechanism capable of presenting an output to a user, or any combination thereof.

Figure 6:
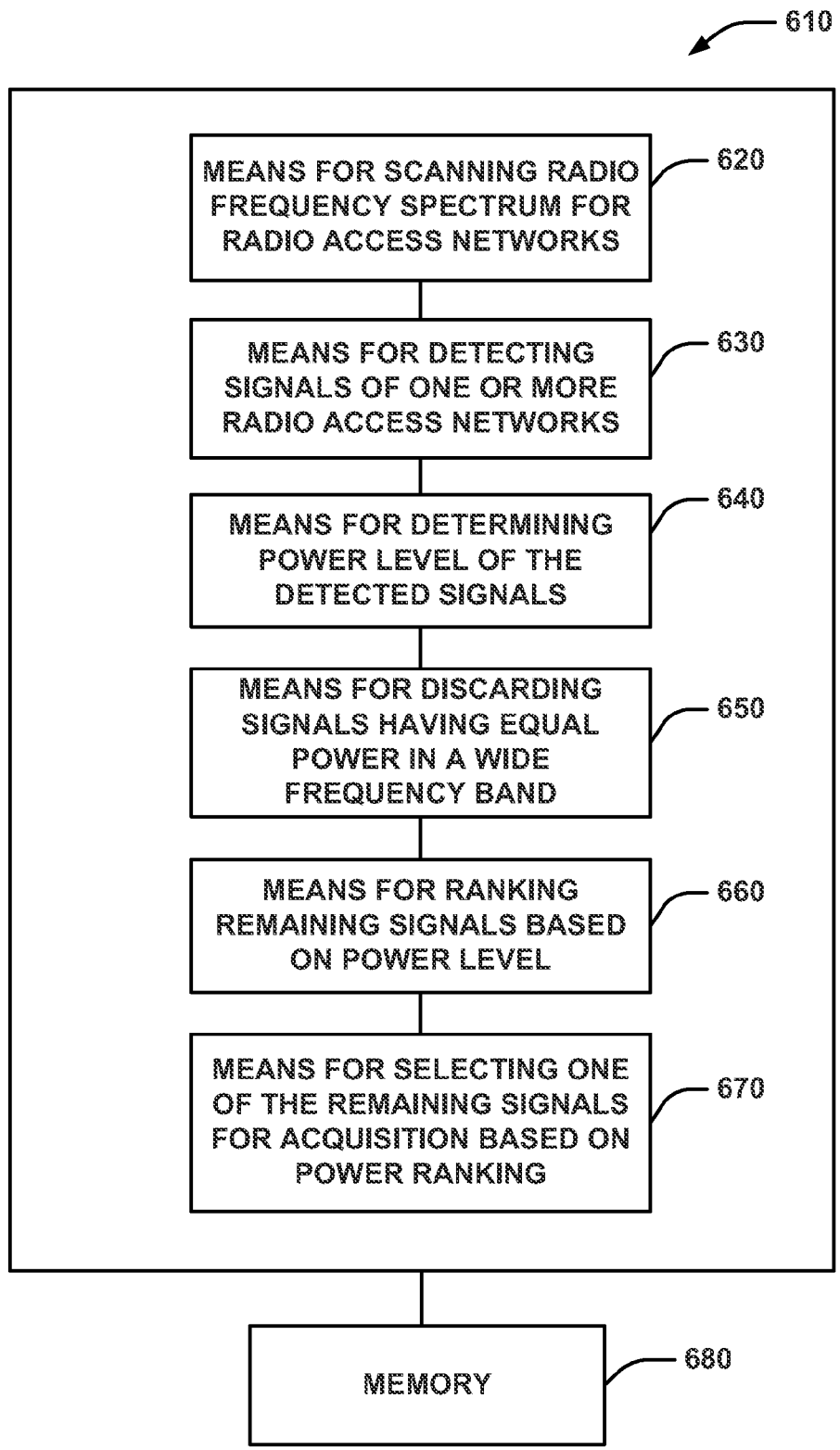
FIG. 6 is an illustration of an example system implementing aspects of mechanisms for wireless system acquisition disclosed herein.

FIG. 6 illustrates a system 600 that may be implemented in a mobile device. As depicted, system 600 includes functional blocks that can represent functions implemented by a processor, software, or combination thereof (e.g., firmware). System 600 includes a logical grouping 610 of electrical components that facilitate execution of algorithms for RAN signal acquisition as disclosed herein. Logical grouping 610 can include means 620 for scanning a radio frequency spectrum for radio access network signals. Further, logical grouping 610 includes means 630 for detecting a plurality of signals corresponding to a plurality of channels of a first network type having a first channel bandwidth. In addition, logical grouping 610 includes means 640 for determining a power level of the detected signal on each of the plurality of channels. Moreover, logical grouping 610 includes means 650 for discarding ones of the plurality of signals having substantially equal power within a first frequency range to define a remaining set of the plurality of signals, wherein the first frequency range corresponds to a second channel bandwidth of a second network type, wherein the second channel bandwidth is greater than the first channel bandwidth. In addition, logical grouping 610 includes means 660 for ranking the remaining set of the plurality of signals based on the determined power level. Lastly, logical grouping 610 includes means 670 for selecting one of the remaining set of the plurality of signals for acquisition based on the ranking. System 600 also includes a memory 660 that retains instructions for executing functions associated with electrical components 620-670. While shown as being external to memory 660, it is to be understood that electrical components 620-670 can exist in memory 680 of the system 600.

Figure 7:
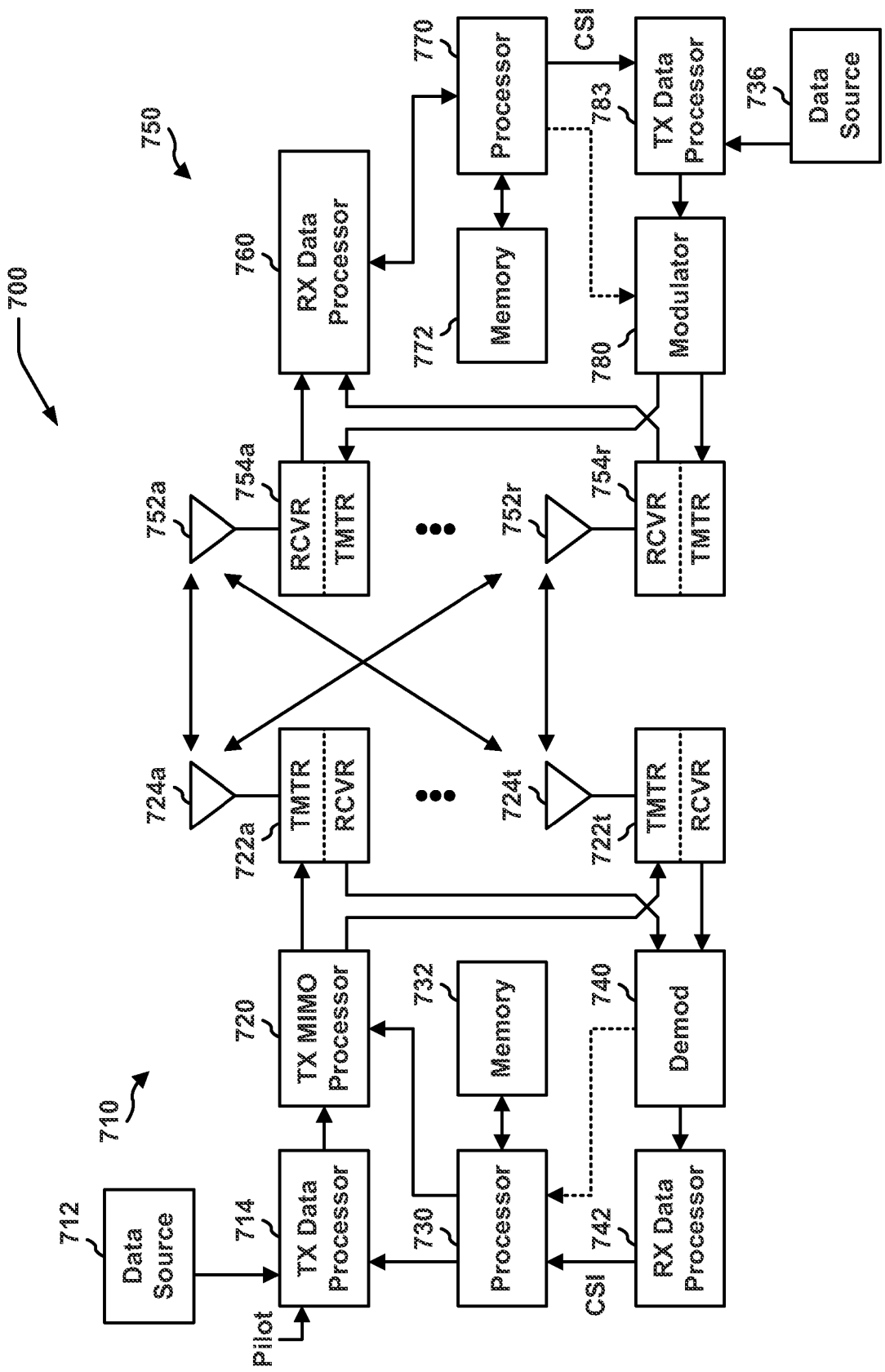
FIG. 7 is an illustration of an example wireless communication system utilizing aspects of mechanisms for wireless system acquisition disclosed herein.

FIG. 7 shows an example of a wireless communication system 700 in which various aspects of the methodologies for RAN signal acquisition may be implemented. The system 700 depicts one base station/forward link transmitter 710 in a radio access network and one mobile device 750 for sake of brevity. However, it is to be appreciated that system 700 can include more than one base station/forward link transmitter and/or more than one mobile device, wherein additional base stations/transmitters and/or mobile devices can be substantially similar or different from example base station/forward link transmitters 610 and mobile device 750 described below. In addition, it is to be appreciated that base station/forward link transmitter 710 and/or mobile device 750 can employ the systems (FIGS. 1, 5 and 6) and/or methods (FIG. 4) described herein to facilitate latency measurement procedures and wireless communication there between.

At base station/forward link transmitter 710, traffic data for a number of data streams is provided from a data source 712 to a transmit (TX) data processor 714. According to an example, each data stream can be transmitted over a respective antenna. TX data processor 714 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 750 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 730.

The modulation symbols for the data streams can be provided to a TX MIMO processor 720, which can further process the modulation symbols (e.g., for OFDM). TX MIMO processor 720 then provides NT modulation symbol streams to NT transmitters (TMTR) 722a through 722t. In various aspects, TX MIMO processor 720 applies beamforming weights to the symbols of the data streams and to the antenna from which the symbol is being transmitted.

Each transmitter 722 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 722a through 722t are transmitted from NT antennas 724a through 724t, respectively.

At mobile device 750, the transmitted modulated signals are received by NR antennas 752a through 752r and the received signal from each antenna 752 is provided to a respective receiver (RCVR) 754a through 754r. Each receiver 754 conditions (e.g., filters, amplifies, and downconverts) a respective signal, digitizes the conditioned signal to provide samples, and further processes the samples to provide a corresponding "received" symbol stream.

An RX data processor 760 can receive and process the NR received symbol streams from NR receivers 754 based on a particular receiver processing technique to provide NT "detected" symbol streams. RX data processor 760 can demodulate, deinterleave, and decode each detected symbol stream to recover the traffic data for the data stream. The processing by RX data processor 760 is complementary to that performed by TX MIMO processor 720 and TX data processor 714 at base station/forward link transmitter 710.

A processor 770 can periodically determine which precoding matrix to utilize as discussed above. Further, processor 770 can formulate a reverse link message comprising a matrix index portion and a rank value portion.

The reverse link message can comprise various types of information regarding the communication link and/or the received data stream. The reverse link message can be processed by a TX data processor 738, which also receives traffic data for a number of data streams from a data source 736, modulated by a modulator 780, conditioned by transmitters 754a through 754r, and transmitted back to base station/forward link transmitter 710.

At base station/forward link transmitter 710, the modulated signals from mobile device 750 can be received by antennas 724, conditioned by receivers 722, demodulated by a demodulator 740, and processed by a RX data processor 742 to extract the reverse link message transmitted by mobile device 750. Further, processor 730 can process the extracted message to determine which precoding matrix to use for determining the beamforming weights. It is to be appreciated that in the case of a forward link transmitter 710, as opposed to a base station, these RX components may not be present since data is only broadcasted over the forward link.

Processors 730 and 770 can direct (e.g., control, coordinate, manage, etc.) operation at base station/forward link transmitter 710 and mobile device 750, respectively. Respective processors 730 and 770 can be associated with memory 732 and 772 that store program codes and data. Processors 730 and 770 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the aspects are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means known in the art.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects, it should be noted that various changes and modifications could be made herein without departing from the scope of the described aspects as defined by the appended claims. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise.

What is claimed is:

1. A method for a mobile device to optimize signal acquisition from a radio access network, comprising
   scanning a radio frequency spectrum for radio access network signals;
   detecting a plurality of signals corresponding to a plurality of channels of a first network type having a first channel bandwidth;
   determining a power level of each detected signal on each of the plurality of channels;
   discarding ones of the plurality of signals having substantially equal power within a first frequency range to define a first remaining set of the plurality of signals, wherein the first frequency range corresponds to a second channel bandwidth of a second network type;
   discarding ones of the first remaining set of the plurality of signals not exhibiting known channel spacing associated with the first network type to define a second remaining set of the plurality of signals;
   ranking the second remaining set of the plurality of signals based on the determined power level; and
   selecting one of the second remaining set of the plurality of signals for acquisition based on the ranking.

2. The method of claim 1, further comprising:
wherein the detecting further comprises detecting the plurality of signals corresponding to a plurality of Absolute Radio Frequency Channel Numbers (ARFCNs) of a GSM network having a first channel bandwidth of 200 kHz, and
wherein the second channel bandwidth is greater than 1.25 MHz.

3. The method of claim 1, further comprising performing a decoding of a frequency correction channel (FCCH) and synchronization channel (SCCH) corresponding to at least one of the remaining set of the plurality of signals in order to acquire a new channel.

4. The method of claim 1, further comprising:
wherein the detecting further comprises detecting the plurality of signals corresponding to a plurality of Absolute Radio Frequency Channel Numbers (ARFCNs) of a GSM network having a first channel bandwidth of 200 kHz, and
wherein the second network type comprises at least one of:
a WCDMA network having a second channel bandwidth of 5 MHz,
a cdma2000 1x network having a second channel bandwidth of 1.25 MHz,
a cdma2000 3x or EV-DO network having a second channel bandwidth of 3.75 MHz, or
a WiMAX network having a second channel bandwidth of between 1.25 MHz and 20 MHz.

5. The method of claim 1, further comprising:
determining the first frequency range; and
determining if the first frequency range corresponds to one of a plurality of second channel bandwidths of one of a plurality of second network types, wherein each of the plurality of second network types comprises a different type of a non-GSM network.

6. The method of claim 1, further comprising identifying the second type of network based on a correlation between the first frequency range and the second channel bandwidth.

7. A communication device, comprising:
a processor and a communications component coupled to the processor, the processor being configured to
scan a radio frequency spectrum for radio access network signals;
detect a plurality of signals corresponding to a plurality of channels of a first network type having a first channel bandwidth;
determine a power level of each detected signal on each of the plurality of channels;
discard ones of the plurality of signals having substantially equal power within a first frequency range to define a first remaining set of the plurality of signals, wherein the first frequency range corresponds to a second channel bandwidth of a second network type;
discard ones of the first remaining set of the plurality of signals not exhibiting known channel spacing associated with the first network type to define a second remaining set of the plurality of signals;
rank the second remaining set of the plurality of signals based on the determined power level and
select one of the second remaining set of the plurality of signals for acquisition based on the ranking.

8. The device of claim 7, wherein to detect a plurality of signals, the processor being further configured to detect the plurality of signals corresponding to a plurality of Absolute Radio Frequency Channel Numbers (ARFCNs) of a GSM network having a first channel bandwidth of 200 kHz, and
wherein the second channel bandwidth is greater than 1.25 MHz.

9. The device of claim 7, the processor being further configured to perform a decoding of a frequency correction channel (FCCH) and synchronization channel (SCCH) corresponding to at least one of the remaining set of the plurality of signals in order to acquire a new channel.

10. The device of claim 7, wherein to detect a plurality of signals, the processor being further configured to detect the plurality of signals corresponding to a plurality of Absolute Radio Frequency Channel Numbers (ARFCNs) of a GSM network having a first channel bandwidth of 200 kHz, and
wherein the second network type comprises at least one of:
a WCDMA network having a second channel bandwidth of 5 MHz,
a cdma2000 1x network having a second channel bandwidth of 1.25 MHz,
a cdma2000 3x or EV-DO network having a second channel bandwidth of 3.75 MHz, or
a WiMAX network having a second channel bandwidth of between 1.25 MHz and 20 MHz.

11. The device of claim 7, the processor being further configured to:
determine the first frequency range; and
determine if the first frequency range corresponds to one of a plurality of second channel bandwidths of one of a plurality of second network types, wherein each of the plurality of second network types comprises a different type of a non-GSM network.

12. The device of claim 7, the processor being further configured to identify the second type of network based on a correlation between the first frequency range and the second channel bandwidth.

13. A non-transitory computer-readable storage medium comprising:
instructions for causing a computer to scan a radio frequency spectrum for radio access network signals;
instructions for causing the computer to detect a plurality of signals corresponding to a plurality of channels of a first network type having a first channel bandwidth;
instructions for causing the computer to determine a power level of each detected signal on each of the plurality of channels;
instructions for causing the computer to discard ones of the plurality of signals having substantially equal power within a first frequency range to define a first remaining set of the plurality of signals, wherein the first frequency range corresponds to a second channel bandwidth of a second network type;
instructions for causing the computer to discard ones of the first remaining set of the plurality of signals not exhibiting known channel spacing associated with the first network type to define a second remaining set of the plurality of signals;
instructions for causing the computer to rank the second remaining set of the plurality of signals based on the determined power level; and
instructions for causing the computer to select one of the second remaining set of the plurality of signals for acquisition based the ranking.

14. The non-transitory computer-readable storage medium of claim 13, the instructions further including
instructions for causing the computer to detect the plurality of signals corresponding to a plurality of Absolute Radio Frequency Channel Numbers (ARFCNs) of a GSM network having a first channel bandwidth of 200 kHz, and wherein the second channel bandwidth is greater than 1.25 MHz.

15. The non-transitory computer-readable storage medium of claim 13, further comprising instructions for causing the computer to perform a decoding of a frequency correction channel (FCCH) and synchronization channel (SCCH) corresponding to at least one of the remaining set of the plurality of signals in order to acquire a new channel.

16. The non-transitory computer-readable storage medium of claim 13, the instructions further including
 instructions for causing the computer to detect the plurality of signals corresponding to a plurality of Absolute Radio Frequency Channel Numbers (ARFCNs) of a GSM network having a first channel bandwidth of 200 kHz, and
 wherein the second network type comprises at least one of:
  a WCDMA network having a second channel bandwidth of 5 MHz,
  a cdma2000 1x network having a second channel bandwidth of 1.25 MHz,
  a cdma2000 3x or EV-DO network having a second channel bandwidth of 3.75 MHz, or
  a WiMAX network having a second channel bandwidth of between 1.25 MHz and 20 MHz.

17. The non-transitory computer-readable storage medium of claim 13, further comprising
 instructions for causing the computer to determine the first frequency range; and
 instructions for causing the computer to determine if the first frequency range corresponds to one of a plurality of second channel bandwidths of one of a plurality of second network types, wherein each of the plurality of second network types comprises a different type of a non-GSM network.

18. The non-transitory computer-readable storage medium of claim 13, further comprising instructions for causing the computer to identify the second type of network based on a correlation between the first frequency range and the second channel bandwidth.

19. An apparatus, comprising:
 means for scanning a radio frequency spectrum for radio access network signals;
 means for detecting a plurality of signals corresponding to a plurality of channels of a first network type having a first channel bandwidth;
 means for determining a power level of the detected signal on each of the plurality of channels;
 means for discarding ones of the plurality of signals having substantially equal power within a first frequency range to define a first remaining set of the plurality of signals, wherein the first frequency range corresponds to a second channel bandwidth of a second network type;
 means for discarding ones of the first remaining set of the plurality of signals not exhibiting known channel spacing associated with the first network type to define a second remaining set of the plurality of signals
 means for ranking the second remaining set of the plurality of signals based on the determined power level; and
 means for selecting one of the second remaining set of the plurality of signals for acquisition based on the ranking.

20. The apparatus of claim 19, further comprising:
 wherein means for detecting further comprises means for detecting the plurality of signals corresponding to a plurality of Absolute Radio Frequency Channel Numbers (ARFCNs) of a GSM network having a first channel bandwidth of 200 kHz, and
 wherein the second channel bandwidth is greater than 1.25 MHz.

21. The apparatus of claim 19, further comprising means for performing a decoding of a frequency correction channel (FCCH) and synchronization channel (SCCH) corresponding to at least one of the remaining set of the plurality of signals in order to acquire a new channel.

22. The apparatus of claim 19, further comprising:
 wherein the means for detecting further comprises means for detecting the plurality of signals corresponding to a plurality of Absolute Radio Frequency Channel Numbers (ARFCNs) of a GSM network having a first channel bandwidth of 200 kHz, and
 wherein the second network type comprises at least one of:
  a WCDMA network having a second channel bandwidth of 5 MHz,
  a cdma2000 1x network having a second channel bandwidth of 1.25 MHz,
  a cdma2000 3x or EV-DO network having a second channel bandwidth of 3.75 MHz, or
  a WiMAX network having a second channel bandwidth of between 1.25 MHz and 20 MHz.

23. The apparatus of claim 19, further comprising:
 means for determining the first frequency range; and
 means for determining if the first frequency range corresponds to one of a plurality of second channel bandwidths of one of a plurality of second network types, wherein each of the plurality of second network types comprises a different type of a non-GSM network.

24. The apparatus of claim 19, further comprising means for identifying the second type of network based on a correlation between the first frequency range and the second channel bandwidth.

* * * * *